United States Patent
Khalil et al.

(10) Patent No.: US 10,097,117 B2
(45) Date of Patent: Oct. 9, 2018

(54) ADJUSTABLE PULSE INJECTION IN ELECTRIC MACHINE CONTROL

(71) Applicant: Caterpillar Inc., Peoria, IL (US)

(72) Inventors: Ahmed Khalil, Dunlap, IL (US); Seok-Hee Han, Dunlap, IL (US); Jackson Wai, Peoria, IL (US); Sangameshwar Sonth, Dunlap, IL (US); Jesse Gerdes, Dunlap, IL (US); James M. Thorne, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/380,790

(22) Filed: Dec. 15, 2016

(65) Prior Publication Data

US 2018/0175754 A1  Jun. 21, 2018

(51) Int. Cl.
*H02P 6/00* (2016.01)
*H02P 6/185* (2016.01)
*H02P 25/089* (2016.01)

(52) U.S. Cl.
CPC .......... *H02P 6/185* (2013.01); *H02P 25/089* (2016.02)

(58) Field of Classification Search
CPC .......... H02P 21/06; H02P 21/18; H02P 21/26; H02P 21/141; H02P 6/21; H02P 23/0004; H02P 1/46; H02P 21/0089; H02P 21/14; H02P 21/24; H02P 21/34; H02P 23/04; H02P 29/025; H02P 6/08; H02P 6/10
See application file for complete search history.

(56) References Cited

U.S. PATENT DOCUMENTS

| | | | |
|---|---|---|---|
| 5,525,886 A | 6/1996 | Lyons et al. | |
| 5,619,112 A * | 4/1997 | Younessi | H02P 6/30 318/436 |
| 6,351,094 B1 | 2/2002 | Green | |
| 6,396,237 B2 | 5/2002 | Mayes | |
| 7,072,790 B2 * | 7/2006 | Hu | H02P 21/06 702/147 |
| 7,116,067 B2 * | 10/2006 | Ma | H02P 6/08 318/151 |
| 7,119,512 B2 | 10/2006 | Green | |
| 7,208,895 B2 * | 4/2007 | Marcinkiewicz | H02P 21/141 318/400.09 |

(Continued)

FOREIGN PATENT DOCUMENTS

KR   1020110112995   10/2011

*Primary Examiner* — Bickey Dhakal
(74) *Attorney, Agent, or Firm* — Finnegan, Henderson, Farabow, Garrett & Dunner, LLP (57) ABSTRACT

A control system is provided for an electric machine having a rotor and a stator. The control system has a converter circuit in electrical communication with the stator and a controller in electrical communication with the converter circuit. The controller is configured to receive a first signal indicating a torque applied to or output by the rotor and receive a second signal indicating a rotational speed of the rotor. The controller is also configured to determine at least one characteristic of a pulse signal based on at least one of the first or second signal. The controller is also configured to inject the pulse signal into one or more phases of the stator via the converter circuit according to the determined at least one characteristic. The controller is also configured to determine a position of the rotor based on the injected pulse signal.

20 Claims, 7 Drawing Sheets

(56) References Cited

U.S. PATENT DOCUMENTS

| | | | |
|---|---|---|---|
| 7,242,163 B2* | 7/2007 | Gallegos-Lopez | H02P 21/06 318/722 |
| 7,375,485 B2* | 5/2008 | Shahi | H02P 21/141 318/432 |
| 7,577,545 B2* | 8/2009 | Hu | H02P 21/06 702/147 |
| 7,629,764 B2* | 12/2009 | Shoemaker | G05B 13/042 318/432 |
| 7,932,691 B2* | 4/2011 | Son | H02P 1/46 318/400.03 |
| 8,248,018 B2* | 8/2012 | Maekawa | H02K 1/276 310/156.03 |
| 8,810,188 B2 | 8/2014 | Husain et al. | |
| 9,231,500 B2* | 1/2016 | Marcetic | H02P 3/18 |
| 2003/0015987 A1* | 1/2003 | Cheong | H02P 21/14 318/701 |
| 2005/0046370 A1* | 3/2005 | Gallegos-Lopez | H02P 21/06 318/434 |
| 2005/0067998 A1 | 3/2005 | Green | |
| 2006/0043923 A1* | 3/2006 | Baker | H02P 21/06 318/807 |
| 2006/0052972 A1* | 3/2006 | Hu | H02P 21/06 702/147 |
| 2006/0061320 A1* | 3/2006 | Ma | H02P 6/08 318/801 |
| 2006/0290304 A1* | 12/2006 | Marcinkiewicz | H02P 21/141 318/432 |
| 2007/0170880 A1* | 7/2007 | Shahi | H02P 21/141 318/432 |
| 2007/0296364 A1* | 12/2007 | Shoemaker | G05B 13/042 318/561 |
| 2008/0278101 A1* | 11/2008 | Shahi | H02P 21/141 318/400.11 |
| 2008/0300820 A1* | 12/2008 | Hu | H02P 21/06 702/147 |
| 2009/0261775 A1* | 10/2009 | Son | H02P 1/46 318/778 |
| 2010/0090640 A1* | 4/2010 | Maekawa | H02K 1/276 318/701 |
| 2011/0057821 A1 | 3/2011 | Kim | |
| 2011/0285332 A1* | 11/2011 | Pollock | H02P 6/18 318/400.02 |
| 2011/0309781 A1* | 12/2011 | Tomigashi | H02P 21/13 318/504 |
| 2013/0009572 A1* | 1/2013 | Byun | H02P 21/06 318/14 |
| 2015/0057970 A1 | 2/2015 | Feuersaenger et al. | |
| 2015/0268283 A1 | 9/2015 | Mariethoz et al. | |
| 2015/0357956 A1* | 12/2015 | Shimada | H02P 6/181 318/400.02 |
| 2015/0381087 A1 | 12/2015 | Han et al. | |

* cited by examiner

ADJUSTABLE PULSE INJECTION IN ELECTRIC MACHINE CONTROL

TECHNICAL FIELD

The present disclosure relates generally to electric machine control, and more particularly, to systems and methods for controlling electric machines using adjustable pulse injection.

BACKGROUND

An electric machine such as an electric motor, power generation system, genset, or the like, is generally used to convert one form of energy into another and may operate in a motoring mode to convert electrical input into rotational or otherwise mechanical output, or operate in a generating mode to convert rotational or otherwise mechanical input into electrical output. Among the various types of electric machines available for use with an electric drive, switched reluctance (SR) machines have received great interest for being robust and cost-effective. A typical SR machine includes a rotor and a stator, each of which may include a plurality of poles. During operation such as in the motoring mode, a rotational field is applied to the stator, which, through the magnetic reluctance effect, "pulls" the rotor along, thus generating the rotor torque.

Among other factors, proper determination of the position and speed of the rotor of the SR machine during relatively low speed operations may have significant impacts on overall performance and efficiency. Some conventional control schemes rely on mechanically aligned speed wheels and sensors to detect and determine the position of the rotor relative to the stator at machine standstill or low speed operations. However, such sensor-based control schemes typically require costly implementations and are susceptible to error. For instance, an error of 2 degrees in the detected mechanical rotor position of an SR machine, caused by a skewed sensor, a mechanical misalignment of the speed wheel, or the like, may correspond to a 0.5% decrease in efficiency of the electric drive assembly at full load.

Sensorless control schemes can also be used to derive the rotor position using electrical characteristics of the SR machine. For example, the control system of U.S. Pat. No. 5,525,886 to Lyons, et al. injects a current signal to compute a total voltage flux in the SR machine. Lyons then determines the rotor position based on the voltage flux and the phase current. While Lyons may provide more simplicity over sensor-based schemes, Lyons' method is susceptible to noises resulting from a pulsating torque created by the injected pulses, especially in a light-load condition when the pulsating torque causes some noticeable torque ripples that would impact the performance. The performance impact may lead to larger position and speed estimation deviation or error that would cause the electric machine to run in an opposite direction or be locked at a lower or higher speed than the target speed.

The present disclosure is directed to overcoming or mitigating one or more of these problems set forth.

SUMMARY OF THE INVENTION

In one aspect, the present disclosure is directed to a control system for an electric machine having a rotor and a stator. The control system includes a converter circuit in electrical communication with the stator of the electric machine. The control system also includes a controller in electrical communication with the converter circuit. The controller is configured to receive a first signal indicating a torque applied to or output by the rotor of the electric machine. The controller is also configured to receive a second signal indicating a rotational speed of the rotor of the electric machine. The controller is also configured to determine at least one characteristic of a pulse signal based on at least one of the first or second signal. In addition, the controller is configured to inject the pulse signal into one or more phases of the stator via the converter circuit according to the determined at least one characteristic. Moreover, the controller is configured to determine a position of the rotor based on the injected pulse signal.

In another aspect, the present disclosure is directed to a method of controlling an electric machine having a rotor and a stator. The method includes receiving a first signal indicating a torque applied to or output by the rotor of the electric machine. The method also includes receiving a second signal indicating a rotational speed of the rotor of the electric machine. The method also includes determining at least one characteristic of a pulse signal based on at least one of the first or second signal. In addition, the method includes injecting the pulse signal into one or more phases of the stator of the electric machine via a converter circuit according to the determined at least one characteristic. Moreover, the method includes determining a position of the rotor based on the injected pulse signal.

In a further aspect, the present disclosure is directed to an electric drive. The electric drive includes an electric machine having a rotor and a stator. The electric drive also includes a converter circuit in electrical communication with the stator. The electric drive also includes a controller in electrical communication with the converter circuit. The controller is configured to receive a first signal indicating a torque applied to or output by the rotor. The controller is also configured to receive a second signal indicating a rotational speed of the rotor. The controller is also configured to determine at least one characteristic of a pulse signal based on at least one of the first or second signal. In addition, the controller is configured to inject the pulse signal into one or more phases of the stator via the converter circuit according to the determined at least one characteristic. Moreover, the controller is configured to determine a position of the rotor based on the injected pulse signal.

DETAILED DESCRIPTION

Figure 1:
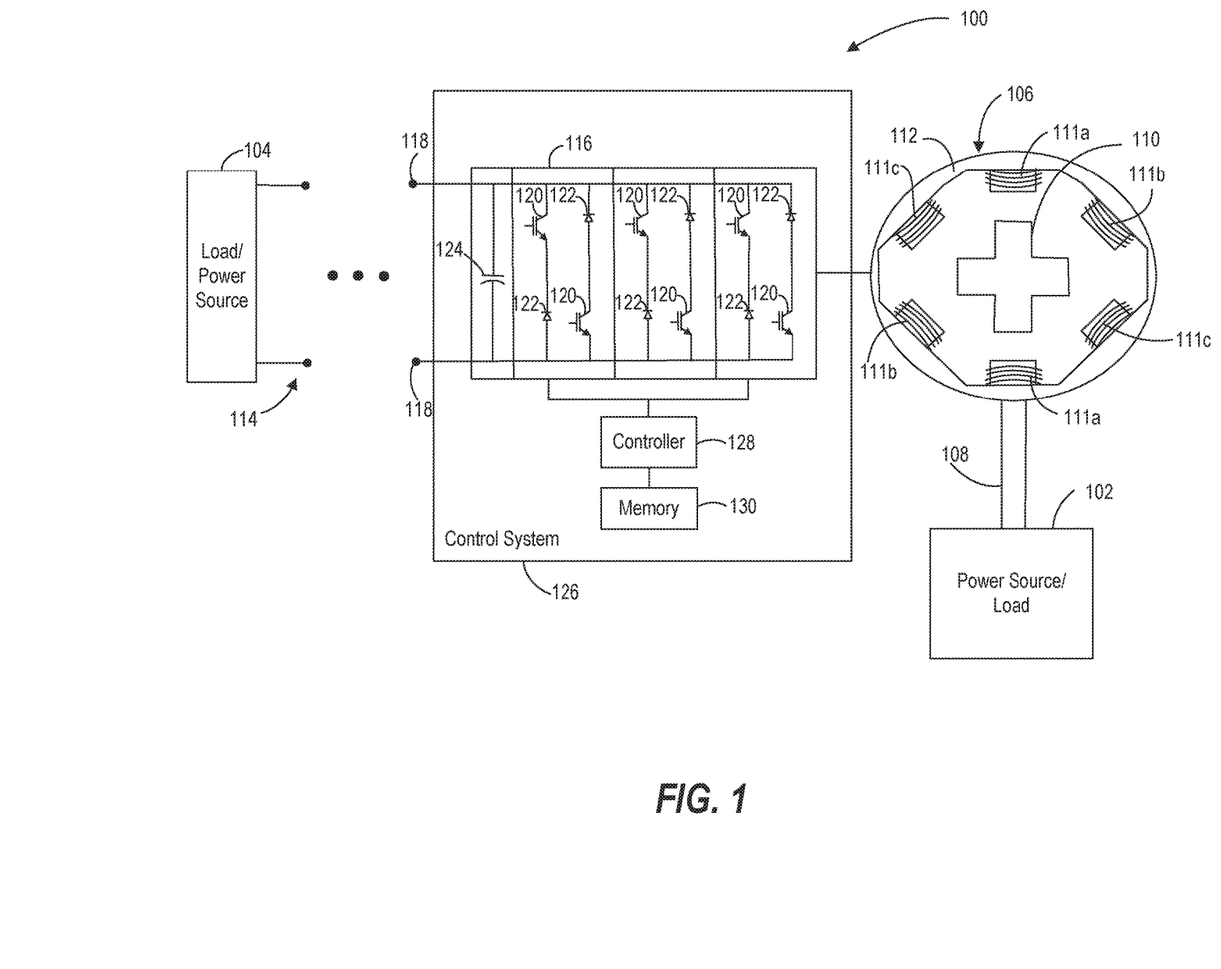
FIG. 1 is a schematic view of an exemplary embodiment of an electric drive with a control system for controlling an electric machine.

FIG. 1 shows an exemplary embodiment of an electric drive 100 that may be employed to communicate power between a power source 102 and one or more electrical loads 104. As used herein, communicating power includes bi-directional transfer of power. When power is transferred from device 102 to device 104, device 102 may act as the power source and device 104 may act as the load. On the other hand, when power is transferred from device 104 to device 102, device 104 may act as the power source and device 102 may act as the load. Therefore, depending on the power transfer direction, either 102 or 104 may act as the power source and the other one may act as the load. For simplicity, in the following description, device 102 will be referred to as the power source and device 104 will be referred to as the load unless otherwise noted. The actual function of devices 102 and 104 would be apparent to those skilled in the art in the context of a particular operating condition.

Referring to FIG. 1, power source 102 may include a diesel engine, a gasoline engine, a natural gas engine, or any other source of mechanical or rotational energy commonly used in association with mobile tools, industrial machines, and the like. Power source 102 may alternatively include power sources commonly used in conjunction with stationary applications, such as windmills, hydro-electric dams, batteries, fuel cells, or any other suitable source of energy. Electrical load 104 may include one or more devices or components that consume and/or employ electrical power provided thereto by electric drive 100. For example, with respect to industrial work machines or mobile work vehicles, electrical loads 104 may include one or more motors for operating tools of the machine and/or one or more traction motors for causing motion of the associated vehicle.

Mechanical energy that is supplied by power source 102 may be converted into electrical power by electric drive 100 for use by the connected electrical load 104. Conversely, electrical power that may be supplied by electrical load 104 and/or electric drive 100 may be supplied to provide mechanical power to power source 102. As shown in FIG. 1, for instance, electric drive 100 may communicate with power source 102 through an electric machine 106 (e.g., a switched reluctance (SR) machine or the like). Electric machine 106 may include a rotor 110 that is rotatably disposed within a fixed stator 112. Rotor 110 may be rigidly and rotatably coupled to an output of power source 102 via a coupling 108, or in other embodiments, via a direct crankshaft, a gear train, a hydraulic circuit, or the like. Stator 112 may include phase windings, such as 111a, 111b, and 111c shown in FIG. 1, which may be electrically coupled to a common bus 114 via a converter circuit 116.

As shown in FIG. 1, electric machine 106 may be a multi-phase SR machine having three phases: A, B, and C. In such examples, the phase windings of stator 112 may each be associated with a respective phase. For example, in the embodiment of FIG. 1, phase windings 111a are associated with phase A, phase windings 111b are associated with phase B, and phase windings 111c are associated with phase C. Each phase A, B, and C may be independently energized by electrical current introduced to stator 112 and controlled by converter circuit 116, as will be discussed in more detail below. While electric machine 106 is depicted in the embodiment of FIG. 1 as having three phases, any number of phases can be used and the systems and methods disclosed herein are applicable to any electric machine having any number of phases.

During a generating mode of operation, as rotor 110 of electric machine 106, driven by the rotational power provided by power source 102, is rotating within stator 112, electrical current may be induced within stator 112 and supplied to converter circuit 116. In some embodiments, the electrical current induced within stator 112 may be an alternate current (AC). Converter circuit 116 may convert the AC current into a direct current (DC) for distribution to electrical load 104 and/or any other device via common bus 114. Common bus 114 may provide terminals 118, such as positive, negative, and/or ground lines, across which common bus 114 may communicate a bus voltage or a DC link voltage between one or more electrically parallel devices of electric drive 100. Electrical load 104 may include circuitry for converting the DC link voltage supplied by converter circuit 116 into appropriate electrical signals for operating one or more devices associated with electric drive 100.

During a motoring mode of operation, or when electrical load 104 becomes the source of electrical power, electric machine 106 may act as an electric motor, causing rotation of rotor 110 in response to electrical power provided to stator 112 and its associated phase windings from common bus 114 via converter circuit 116.

As shown in FIG. 1, converter circuit 116 may include a series of transistors or gated switches 120 and diodes 122 for selectively enabling phase windings, which may be associated with individual phases, such as phases A, B, and C, of electric machine 106. In the embodiment shown in FIG. 1, for example, electric machine 106 may have three phases A, B, and C, and may be driven using by converter circuit 116 with six switches 120 and six diodes 122 for selectively enabling or disabling each of the three phases A, B, and C. Each of the switches 120 may be enabled or disabled via gate signals. As used herein, the term "enable" is interchangeable with the "turn on" and the term "disable" is interchangeable with "turn off." Electric drive 100 may include an external or secondary power source 124 (e.g., a capacitor, battery, etc.), which may store the DC power converted by converter circuit 116 when electric machine 106 operates in the generating mode, and provide DC power across the positive and negative terminals 118 of common bus 114 to force current through the respectively enabled switches 120 and diodes 122 when electric machine 106 operates in the motoring mode. Electric drive 100 may also include a control system 126 configured to, among other things, determine the position of rotor 110 of electric machine 106 relative to stator 112 and control operation of electric machine 106 based on the determined rotor position.

As illustrated in FIG. 1, control system 126 may include converter circuit 116, at least one controller 128 in communication with switches 120 of converter circuit 116, and a memory 130 in communication with controller 128. Memory 10 may be provided within and/or external to controller 128. Controller 128 may be electrically coupled to switches 120 to selectively engage switches 120 and phase currents from the different phases of electric machine 106. Controller 128 may also monitor electrical characteristics of electric machine 106, the bus or DC link voltage of common bus 114, or the like, during operation of electric machine 106. Memory 130 may retrievably store one or more algorithms, machine data, predefined relationships between different machine parameters, preprogrammed models, such as in the form of lookup tables and/or maps, or any other information that may be accessed by controller 128 and relevant to the operation of electric machine 106.

Controller 128 may be implemented using one or more of a processor, a microprocessor, a microcontroller, a digital signal processor (DSP), a field-programmable gate array (FPGA), an electronic control module (ECM), an electronic control unit (ECU), or any other suitable means for electronically controlling functionality of control system 126.

Controller 128 may be configured to operate according to predetermined algorithms or sets of instructions for controlling electric drive 100 and/or electric machine 106 based on the rotational speed and/or position of rotor 110 relative to stator 112 or other operating characteristics of electric drive 100. Such algorithms or sets of instructions may be preprogrammed or incorporated into memory 130 that is associated with or at least accessible to controller 128. Moreover, the algorithms or instructions implemented by controller 128 may be categorized into modular arrangements such as those schematically shown in FIG. 2.

Figure 2:
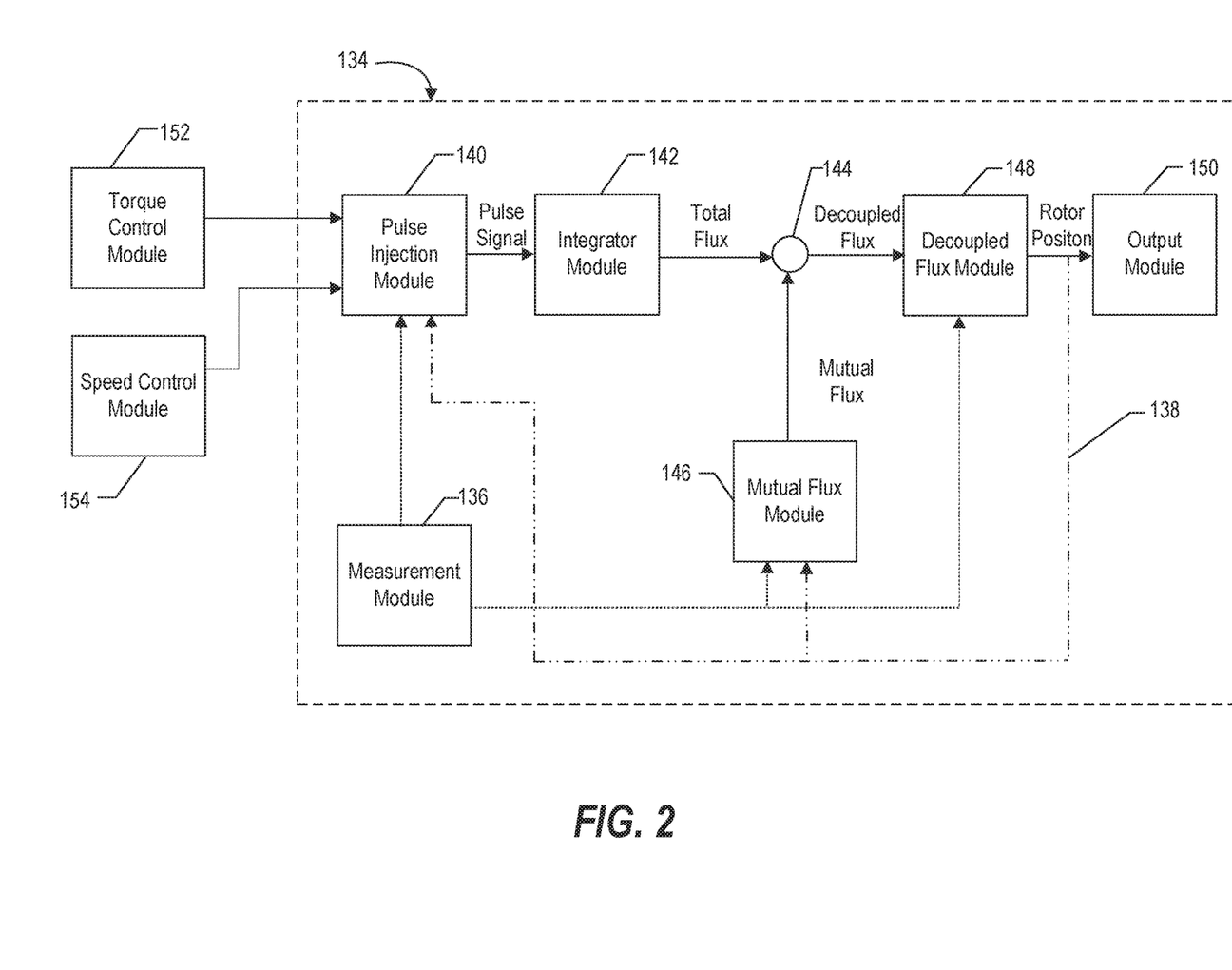
FIG. 2 is a schematic diagram of an exemplary embodiment of a control scheme implemented by the control system of FIG. 1.

FIG. 2 shows an exemplary embodiment of a control scheme 134 for operating electric machine 106. As described above, control scheme 134 may be implemented on controller 128 and configured to determine the position of rotor 110 relative to stator 112 of electric machine 106. As shown in FIG. 2, control scheme 134 may include a measurement module 136 configured to monitor the phase current of electric machine 106, or at least the current through each idle phase (e.g., an idle phase refers to a phase that is "disabled" by turning off the corresponding switch of converter circuit 116 that is connected to that phase), and communicate data corresponding to the measured phase current with one or more modules implemented on controller 128 to perform computational and/or operational tasks. Control scheme 134 may also include a feedback loop 138 that provides data pertaining to the last known or most recently determined rotor position, or rotor position feedback data, to be referenced during one or more computations or operations performed by controller 128.

Control scheme 134 may further implement a pulse injection module 140 configured to inject a pulse signal into the relevant phase(s) of electric machine 106. In some embodiments, pulse injection module 140 may be configured to inject a pulse signal having adjustable current peaks during an adjustable injection timing through one or more phases (e.g., one or more idle or non-controlling phases) of stator 112. The pulse signal may include a plurality of high frequency pulses having a pulse period much lower than the period of the phase current. For example, the pulse period may be in the range of 0.1-1 millisecond and may be separated by a period about 0.01-0.1 millisecond. The pulse injection timing (e.g., the start or finish timing of applying the pulse signal), current peak (e.g., the magnitude of the pulse), and consistency of the pulse signal may be based, at least partially, on the measured phase current provided by measurement module 136 and the rotor position feedback data provided by feedback loop 138. The injected pulse signal may then be communicated to an integrator module 142 that integrates the pulse signal to calculate a corresponding total flux value induced in the phase(s) of electric machine 106 in which the pulse signal is injected.

After the total flux value has been determined, control scheme 134 may be configured to determine a self-induced or decoupled flux value corresponding to the phase(s) in which the pulse signal is injected from the total flux value. Because the total flux value is the sum of the decoupled flux value and a mutual flux value (e.g., flux due to mutual coupling for a given set of phases of electric machine 106), control scheme 134 may determine the decoupled flux value based on a difference between the total flux value and the mutual flux value. For example, control scheme 134 may employ an adder 144, or the like, to subtract the mutual flux value from the total flux value, thereby isolating the decoupled flux value. To determine the mutual flux, control scheme 134 may include a mutual flux model 146, which outputs or estimates the mutual flux value based on the operating state of electric machine 106. For example, mutual flux model 146 may provide one or more preprogrammed lookup tables, maps, or the like, which correlate different mutual flux values for different combinations of phase current and rotor position. Using such predefined models, control scheme 134 may determine the mutual flux value based on the phase current measured by measurement module 136 and the rotor position provided by feedback loop 138.

Based on the decoupled flux value determined for a given set of phase(s), control scheme 134 may employ a decoupled flux model 148 to determine the corresponding rotor position. Decoupled flux model 148 may employ one or more lookup tables, maps, or the like, which are preprogrammed according to known relationships between rotor position, phase current, and decoupled or self-induced flux values suitable for standstill or low speed operations of electric machine 106. For example, based on the computed decoupled flux value and the phase current measured by measurement module 136, decoupled flux model 148 may determine an estimate of the current rotor position. Control scheme 134 may further provide an output module 150 to perform any additional computations on the determined rotor position. For example, output module 150 may be configured to derive the rotor speed and/or direction to further aid in the control of converter circuit 116 and/or electric machine 106. The rotor position data may also be fed back into control scheme 134 by feedback loop 138 for further iterations.

Figure 3:
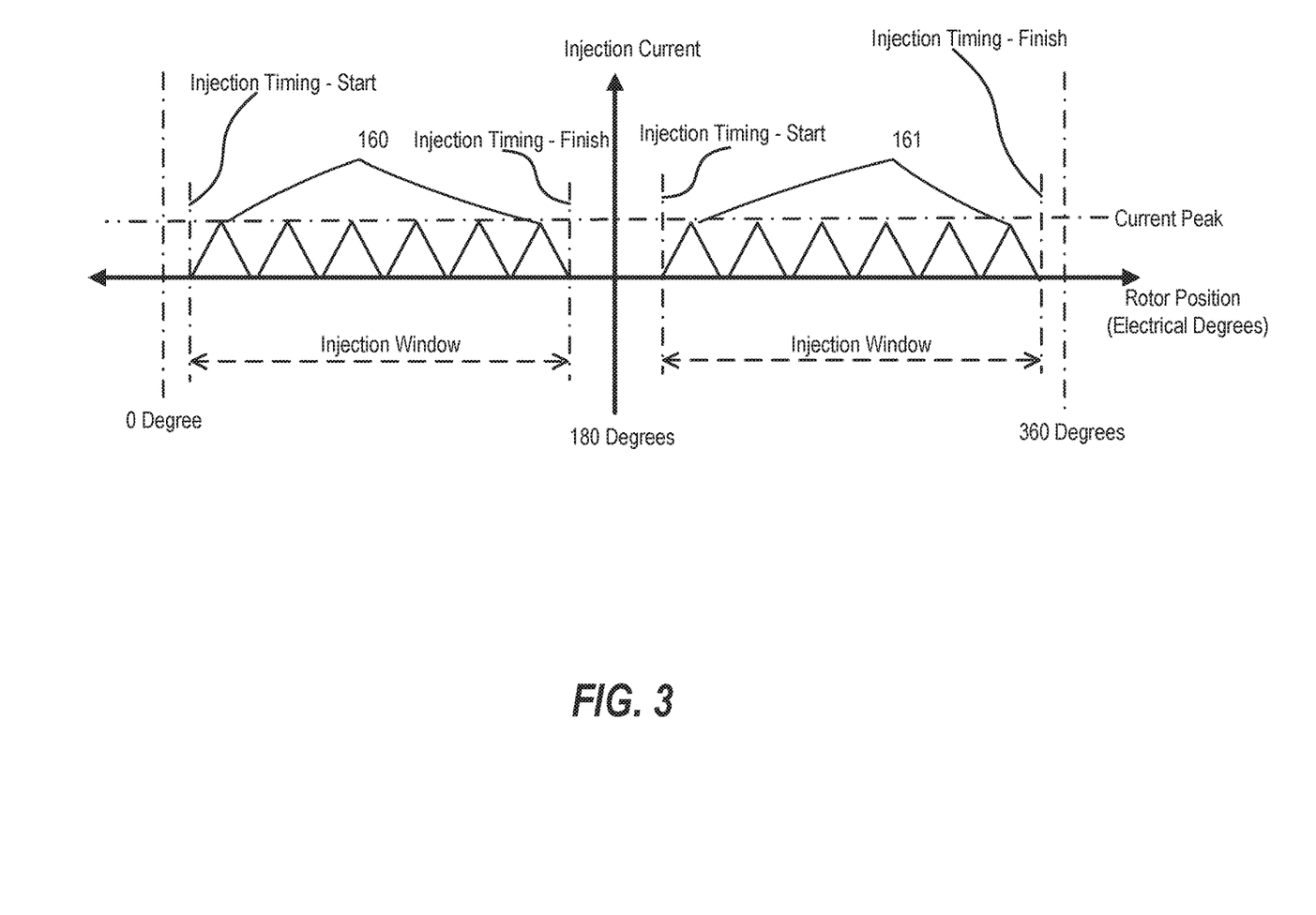
FIG. 3 is a graph showing exemplary injection pulse signals.

FIG. 3 shows a graph showing exemplary pulse signals 160, 161. Referring to FIG. 3, pulse signal 160/161 may each include a plurality of pulses and may have one or more characteristics that define its properties. One characteristic is the current peak of the pulse signal, as shown in FIG. 3. The current peak of a pulse signal refers to the magnitude of the pulses in the pulse signal, also referred to as the current height, signal height, signal peak, or the like. Another characteristic is the injection timing of the pulse signal, as shown in FIG. 3. The injection timing of a pulse signal refers to the start or finish timing of applying or injecting the pulse signal into the one or more phases of electric machine 106. The start and finish timing of applying/injecting the pulse signal may affect the duration in which the pulse signal is applied, also referred to as an injection window. Because the exact time duration of an injection window depends on the rotational speed of rotor 110, the length of an injection window and the start/finish of the pulse injection may be quantified by the rotor position in electrical degrees, where a full round of rotor rotation measures 360 electrical degrees. Accordingly, an injection window is "short" when the number of electrical degrees spanning from the start to the finish of the injected pulse signal are small. Note that a short injection window does not necessarily mean that the actual time duration is also short out of the context of the rotor rotational speed.

In some embodiments, the injected pulse signal (e.g., 160, 161) may cause a pulsating torque. When the torque output by or applied to rotor 110 is relative small, the pulsating torque caused by the injected pulse signal may create noticeable torque ripples that may in turn impact the performance of electric machine 106. In some cases, the performance impact may lead to position/speed estimation deviations/errors that would cause electric machine 106 to operate in an opposite direction or be locked at a lower/higher speed than the target speed. To mitigate the impact of the pulsating torque caused by the injected pulse signal, controller 128 may modulate the current peaks and/or the injection timing based on torque and/or rotational speed of rotor 110.

Referring back to FIG. 2, control scheme 134 may be configured to receive a first signal indicating a torque applied to or output by rotor 110 from a torque control module 152. Control scheme 134 may also be configured to receive a second signal indicating a rotational speed of rotor 154 from a speed control module 154. Torque control module 152 and speed control module 154 may be external to control scheme 134. In some embodiments, torque control module 152 and/or speed control module 154 may be part of control scheme 134. In some embodiments, control scheme 134 may receive the torque and/or rotational speed information from modules other than 152/154. For example, the rotational speed information may be provided feedback loop 138.

Figure 4:
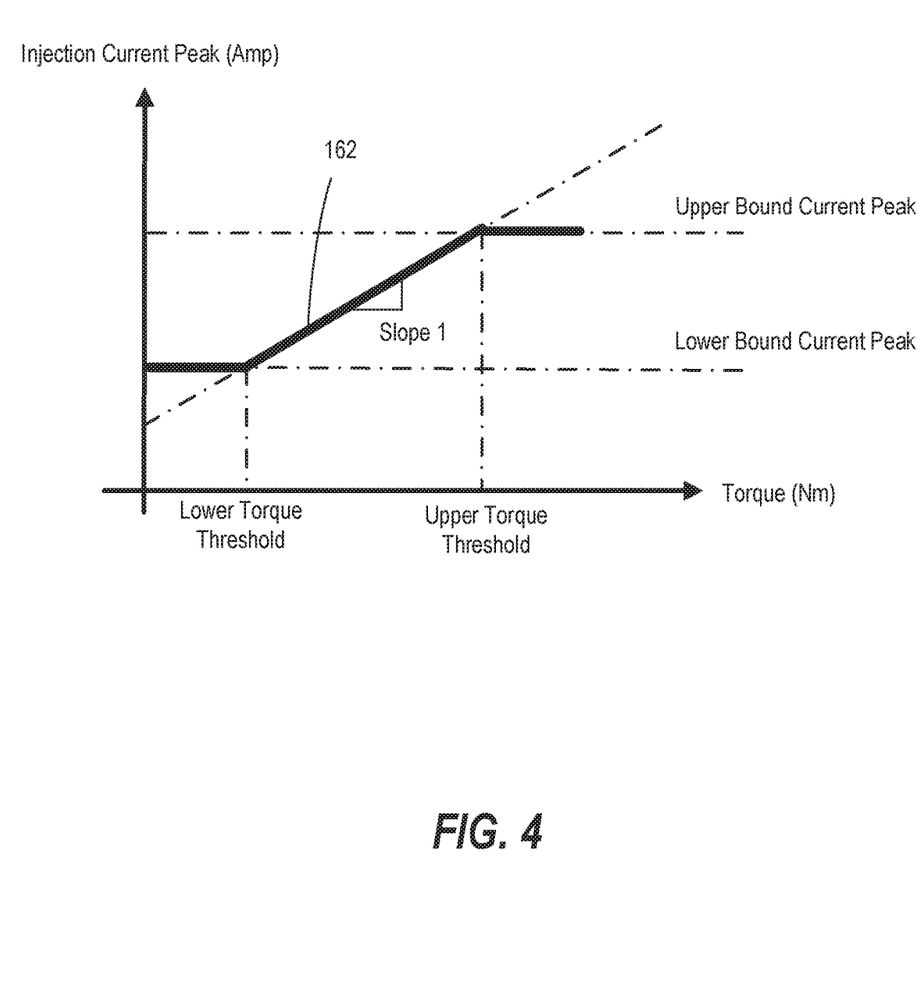
FIG. 4 is a graph showing an exemplary relationship between current peak values and torque values.
Figure 5:
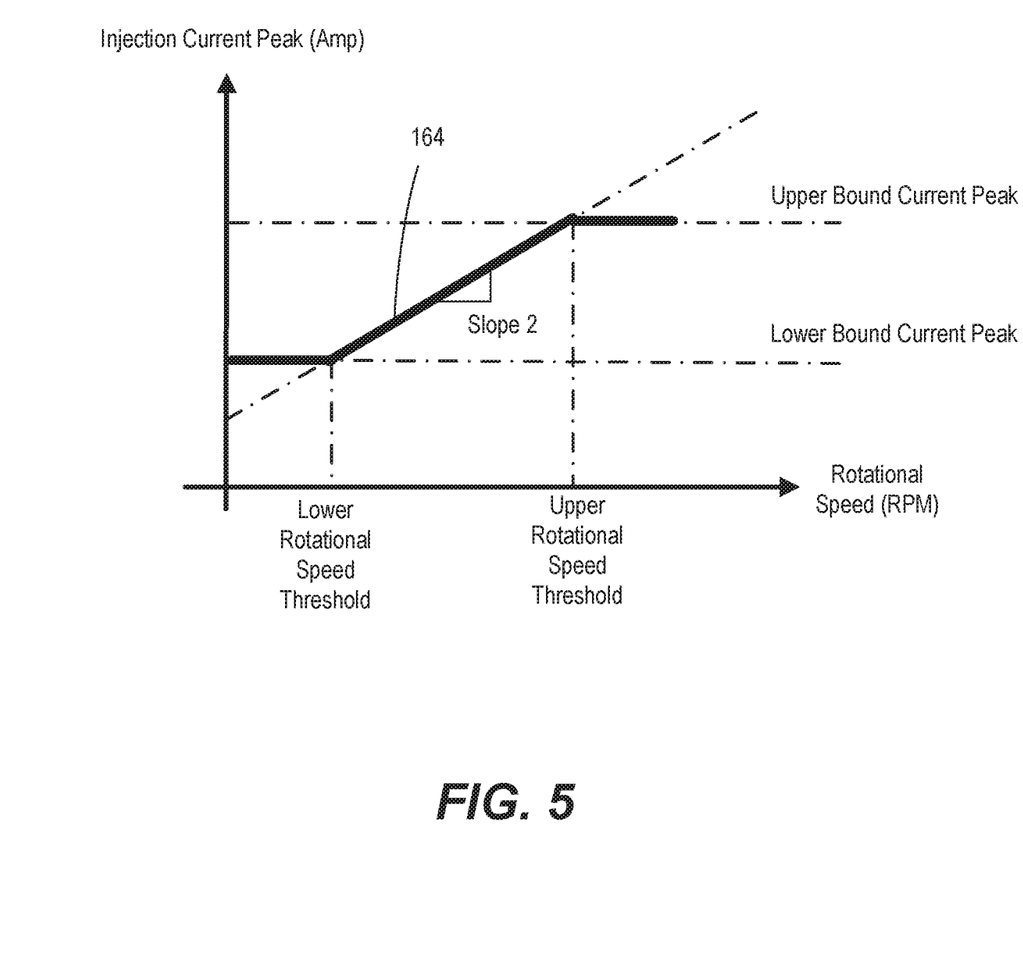
FIG. 5 is a graph showing an exemplary relationship between current peak values and rotational speed values.
Figure 6:
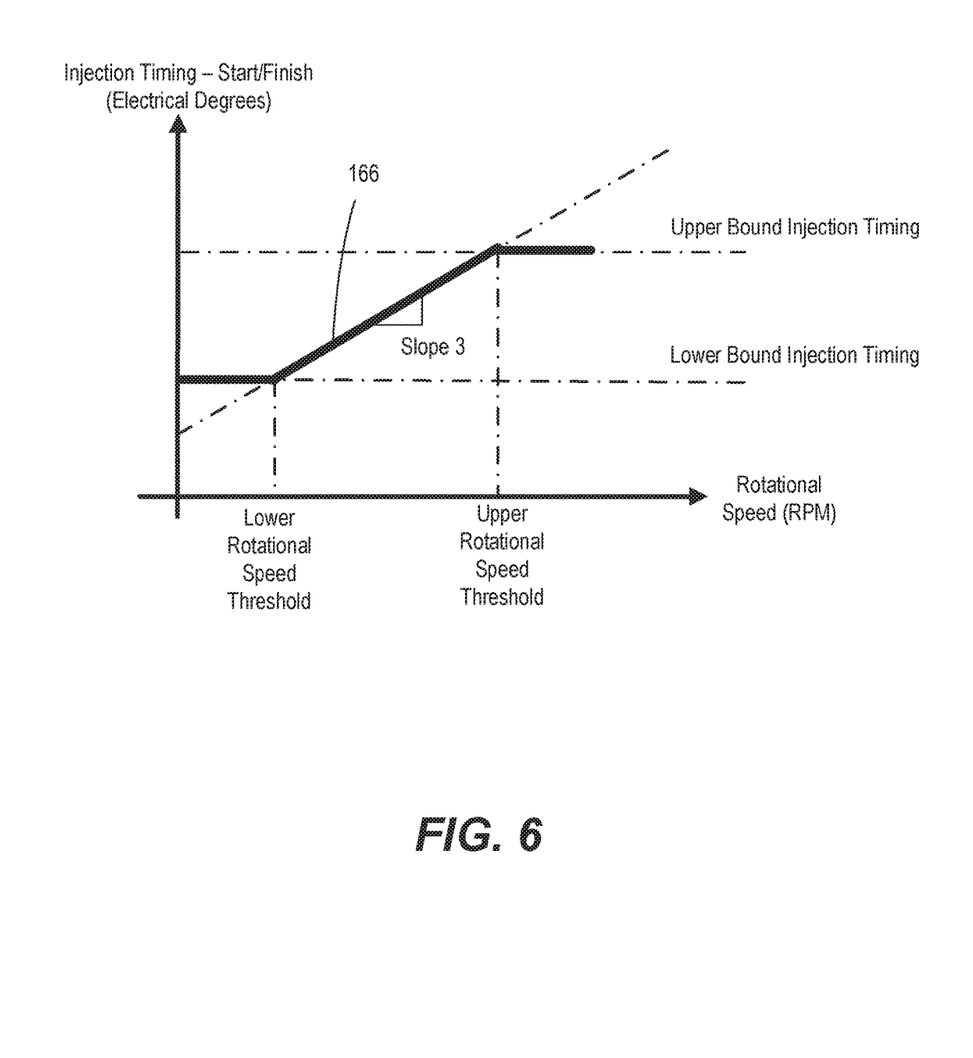
FIG. 6 is a graph showing an exemplary relationship between injection timing and rotational speed.

FIGS. 4-6 show exemplary relationships between current peaks/the injection timing and torque/rotational speed used for modulating or adjusting the current peaks and/or the injection timing.

FIG. 4 shows an exemplary relationship between current peak and torque (e.g., by a curve 162). Referring to FIG. 4, when the torque applied to or output by rotor 110 is low (e.g., when the load is light during motoring mode), the phase currents of electric machine 106 may also be relatively small. In this case, the injection pulse signal used for position estimation may be kept or adjusted to a relatively small level. For example, as shown in FIG. 4, the current peak of the pulses may be small when the torque is small. Once the torque starts to rise (e.g., when the actual load starts to increase during motoring mode), the current peak may also increase, as shown by a ramping portion of curve 162. In some embodiments, the current peak may increase proportionally to the torque. For example, the current peak may be linearly related to the torque, as quantified by a first slope value Slope 1 in FIG. 4. In some embodiments, the current peak may be kept at a minimal level to provide necessary position information regardless of the torque value. In such cases, the current peak may be clamped at a lower bound current peak value when the torque is below a predetermined lower torque threshold. Similarly, in some embodiments, the current peak may be kept at a maximum level regardless of the torque value. In such cases, the current peak may be clamped at an upper bound current peak value when the torque is larger than a predetermined upper torque threshold.

Similarly, the current peak may also be modulated or adjusted based on rotational speed of rotor 110. FIG. 5 shows an exemplary relationship between current peak and rotational speed (e.g., by a curve 164). Referring to FIG. 5, when the rotational speed of rotor 110 is low, the injection pulse signal used for position estimation may be kept or adjusted to a relatively small level. For example, as shown in FIG. 5, the current peak of the pulses may be small when the rotational speed is small. Once the rotational speed starts to rise, the current peak may also increase, as shown by a ramping portion of curve 164. In some embodiments, the current peak may increase proportionally to the rotational speed. For example, the current peak may be linearly related to the rotational speed, as quantified by a second slope value Slope 2 in FIG. 5. In some embodiments, the current peak may be kept at a minimal level to provide necessary position information regardless of the rotational speed. In such cases, the current peak may be clamped at a lower bound current peak value when the rotational speed is below a predetermined lower rotational speed threshold. Similarly, in some embodiments, the current peak may be kept at a maximum level regardless of the rotational speed value. In such cases, the current peak may be clamped at an upper bound current peak value when the rotational speed is higher than a predetermined upper rotational speed threshold.

In some cases, the current peak value determined based on torque may be the same as or substantially the same as that determined based on rotational speed. In such cases, the current peak value may be either the value determined based on torque or the value determined based on rotational speed. In other cases, the current peak value determined based on torque may be different from those determined based on rotational speed. In such cases, controller 128 may select the larger one of the two values.

FIG. 6 shows an exemplary relationship between injection timing and rotational speed (e.g., by a curve 166). Referring to FIG. 6, when the rotational speed of rotor 110 is low, the start or finish timing of injecting the pulse signal used for position estimation may be kept or adjusted to a relatively small value (e.g., in electrical degrees). In some embodiments, the injection timing may affect the injection window of pulse signal injection. For example, as shown in FIG. 6, the injection timing of the pulses may be adjusted or kept to be a small value when the rotational speed is small. This may in turn cause a small injection window. Once the rotational speed starts to rise, the injection timing may also increase, as shown by a ramping portion of curve 166. In some embodiments, the injection timing may increase proportionally to the rotational speed. For example, the injection timing may be linearly related to the rotational speed, as quantified by a third slope value Slope 3 in FIG. 6. In some embodiments, the injection timing may be kept at a minimal level to provide necessary position information regardless of the rotational speed. In such cases, the injection timing may be clamped at a lower bound injection timing value when the rotational speed is below a predetermined lower rotational speed threshold. Similarly, in some embodiments, the injection timing may be kept at a maximum level regardless of the rotational speed value. In such cases, the injection timing may be clamped at an upper bound injection timing value when the rotational speed is higher than a predetermined upper rotational speed threshold.

Figure 7:
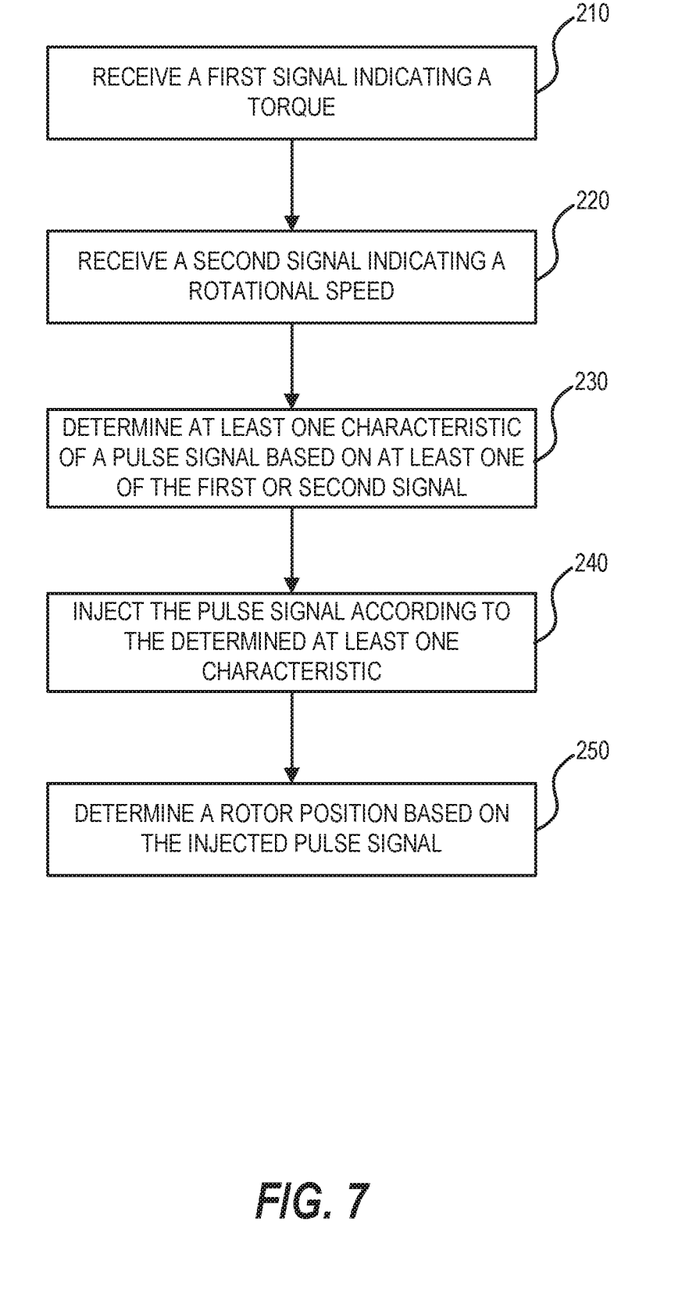
FIG. 7 is a flow diagram of an exemplary embodiment of a method for controlling the electric machine of FIG. 1.

FIG. 7 shows a flow diagram of an exemplary embodiment of a method for controlling electric machine 106. As shown in FIG. 7, exemplary method begins at step 210, in which controller 128 may receive a first signal (e.g., signal from torque control module 152) indicating a torque applied to or output by rotor 110. At step 220, controller 128 may receive a second signal (e.g., signal from speed control module 154 or feedback loop 138) indicating a rotational speed of rotor 110. At step 230, controller 128 may determine at least one characteristic (e.g., current peak or injection timing or both) of a pulse signal (e.g., 160, 161 in FIG. 3) based on at least one of the first or the second signal. For example, controller 128 may determine the current peak based on torque according to the relationship shown in FIG. 4, determine the current peak based on rotational speed according to the relationship shown in FIG. 5, and/or determine the injection timing based on rotational speed according to the relationship shown in FIG. 6. At step 240, controller 128 may inject the pulse signal to one or more phases of stator 112 according to the determined at least one characteristic. For example, the pulse signal may be injected by pulse injection module 140 shown in FIG. 2. At step 250, controller 128 may determine a rotor position based on the injected pulse signal. For example, the rotor position may be estimated by integrating the pulse signal (e.g., using integrator module 142), isolating the decoupled flux (e.g., using adder 144 to subtract mutual flux), and computing the estimated rotor position (e.g., using decoupled flux model 148).

INDUSTRIAL APPLICABILITY

In general, the foregoing disclosure finds utility in various applications relating to electric machines such as switched reluctance (SR) machines or any other suitable electric machines being employed as motors and/or generators. In particular, the disclosed systems and methods may be used to provide more efficient control of electric machines that are typically employed in association with the electric drives of power generation machines, industrial work vehicles, and other types of machines commonly used in the art. The present disclosure may also be implemented with other variable-speed drives commonly used in association with industrial and consumer product applications. The present disclosure may further be used with integrated starters, generators, or the like, commonly associated with automotive, aerospace, and other comparable mobile applications.

More specifically, the present disclosure provides a means for operating an electric machine during standstill and low speed operations which does not rely on complex and costly rotor position sensors to provide reliable rotor position feedback. In particular, the systems and methods disclosed herein provide more accurate, cost-effective and sensorless means for determining rotor position to enable more efficient operation of electric machines. The present disclosure thereby also enables implementation of electric machines and associated electric drives in applications where use of rotor position sensors was otherwise not practical.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A control system for an electric machine having a rotor and a stator, the control system comprising:
    a converter circuit in electrical communication with the stator of the electric machine, the stator including a plurality of phase windings each associated with a separate phase of the stator; and
    a controller in electrical communication with the converter circuit, the controller including:
        a measurement module configured to measure a phase current passing through each of the phase windings of the stator;
        a pulse injection module configured to:
            receive a signal from the measurement module indicative of a phase current in a phase winding of the stator;
            receive rotor position feedback data from a feedback loop;
            receive a first signal from a torque control module indicating a torque applied to or output by the rotor of the electric machine;
            receive a second signal from one of a speed control module or a feedback loop indicating a rotational speed of the rotor of the electric machine;
            determine at least one characteristic of a pulse signal for use in estimating a position of the rotor, the at least one characteristic being based on at least one of the first or second signal;
            generate the pulse signal including a plurality of high frequency pulses having a pulse period lower than a period of the phase current and based at least in part on the measured phase current received from the measurement module and the rotor position feedback data provided by the feedback loop; and
            inject the pulse signal into the phase winding of the stator via the converter circuit;
        an integrator module configured to receive the pulse signal generated by the pulse injection module and integrate the pulse signal to calculate a corresponding total flux value induced in the phase winding of the stator in which the pulse signal is injected;
        an adder configured to receive the total flux value from the integrator module and a mutual flux value resulting from a mutual coupling of a set of phases of the stator of the electric machine and subtract the mutual flux value from the total flux value to determine a decoupled flux value; and
        a decoupled flux module configured to receive the decoupled flux value and estimate a current position of the rotor based on the decoupled flux.

2. The control system of claim 1, wherein the at least one characteristic includes at least one of a current peak of the pulse signal or an injection timing indicating a start or finish of injecting the pulse signal.

3. The control system of claim 1, wherein the controller is configured to:
    determine a torque value based on the first signal; and
    determine the at least one characteristic of the pulse signal according to a predetermined relationship between the at least one characteristic and the torque value.

4. The control system of claim 3, wherein the predetermined relationship includes a proportional relationship between the at least one characteristic and the torque value.

5. The control system of claim 3, wherein the controller is configured to:
    determine whether the torque value is within a predetermined range defined by a lower torque threshold and an upper torque threshold;
    when the torque value is within the predetermined range, determine the at least one characteristic according to the predetermined relationship between the at least one characteristic and the torque value;
    when the torque value is greater than the upper torque threshold, clamp the at least one characteristic at a predetermined upper bound value; and
    when the torque value is smaller than the lower torque threshold, clamp the at least one characteristic at a predetermined lower bound value.

6. The control system of claim 1, wherein the controller is configured to:
    determine a rotational speed value based on the second signal; and
    determine the at least one characteristic of the pulse signal according to a predetermined relationship between the at least one characteristic and the rotational speed value.

7. The control system of claim 6, wherein the predetermined relationship includes a proportional relationship between the at least one characteristic and the rotational speed value.

8. The control system of claim 6, wherein the controller is configured to:

determine whether the rotational speed value is within a predetermined range defined by a lower rotational speed threshold and an upper rotational speed threshold;

when the rotational speed value is within the predetermined range, determine the at least one characteristic according to the predetermined relationship between the at least one characteristic and the rotational speed value;

when the rotational speed value is greater than the upper rotational speed threshold, clamp the at least one characteristic at a predetermined upper bound value; and when the rotational speed value is smaller than the lower rotational speed threshold, clamp the at least one characteristic at a predetermined lower bound value.

9. The control system of claim 1, wherein the controller is configured to:

determine a first value associated with the at least one characteristic based on the first signal;

determine a second value associated with the at least one characteristic based on the second signal;

when the first value is equal to the second value, determine a value of the at least one characteristic to be equal to either the first or second value; and when the first value is different from the second value, determine the value of the at least one characteristic to be equal to a larger one of the first and second values.

10. A method of controlling an electric machine having a rotor and a stator, the stator including a plurality of phase windings each associated with a separate phase of the stator, the method comprising:

measuring a phase current in a phase winding of the stator using a measurement module;

receiving at a pulse injection module a signal from the measurement module indicative of the phase current in the phase winding of the stator;

receiving at the pulse injection module rotor position feedback data from a feedback loop;

receiving at the pulse injection module a first signal from a torque control module indicating a torque applied to or output by the rotor of the electric machine;

receiving at the pulse injection module a second signal from one of a speed control module or a feedback loop indicating a rotational speed of the rotor of the electric machine;

determining at least one characteristic of a pulse signal for use in estimating a position of the rotor, the at least one characteristic being based on at least one of the first or second signal;

generating the pulse signal with the pulse injection module, the pulse signal including a plurality of high frequency pulses having a pulse period lower than a period of the phase current and based at least in part on the measured phase current received from the measurement module and the rotor position feedback data provided by the feedback loop;

injecting the pulse signal with the pulse injection module into the phase winding of the stator via a converter circuit;

receiving the pulse signal at an integrator module and integrating the pulse signal to calculate a corresponding total flux value induced in the phase winding of the stator in which the pulse signal is injected;

receiving the total flux value at an adder from the integrator module and a mutual flux value resulting from a mutual coupling of a set of phases of the stator of the electric machine and subtracting the mutual flux value from the total flux value to determine a decoupled flux value; and receiving the decoupled flux value at a decoupled flux module and estimating a current position of the rotor based on the decoupled flux.

11. The method of claim 10, wherein the at least one characteristic includes at least one of a current peak of the pulse signal or an injection timing indicating a start or finish of injecting the pulse signal.

12. The method of claim 10, further comprising:
determining a torque value based on the first signal; and
determining the at least one characteristic of the pulse signal according to a predetermined relationship between the at least one characteristic and the torque value.

13. The method of claim 12, wherein the predetermined relationship includes a proportional relationship between the at least one characteristic and the torque value.

14. The method of claim 12, further comprising:
determining whether the torque value is within a predetermined range defined by a lower torque threshold and an upper torque threshold;
when the torque value is within the predetermined range, determining the at least one characteristic according to the predetermined relationship between the at least one characteristic and the torque value;
when the torque value is greater than the upper torque threshold, clamping the at least one characteristic at a predetermined upper bound value; and
when the torque value is smaller than the lower torque threshold, clamping the at least one characteristic at a predetermined lower bound value.

15. The method of claim 10, further comprising:
determining a rotational speed value based on the second signal; and
determining the at least one characteristic of the pulse signal according to a predetermined relationship between the at least one characteristic and the rotational speed value.

16. The method of claim 15, wherein the predetermined relationship includes a proportional relationship between the at least one characteristic and the rotational speed value.

17. The method of claim 15, further comprising:
determining whether the rotational speed value is within a predetermined range defined by a lower rotational speed threshold and an upper rotational speed threshold;
when the rotational speed value is within the predetermined range, determining the at least one characteristic according to the predetermined relationship between the at least one characteristic and the rotational speed value;
when the rotational speed value is greater than the upper rotational speed threshold, clamping the at least one characteristic at a predetermined upper bound value; and
when the rotational speed value is smaller than the lower rotational speed threshold, clamping the at least one characteristic at a predetermined lower bound value.

18. The method of claim 10, further comprising:
determining a first value associated with the at least one characteristic based on the first signal;
determining a second value associated with the at least one characteristic based on the second signal;

when the first value is equal to the second value, determining a value of the at least one characteristic to be equal to either the first or second value; and when the first value is different from the second value, determining the value of the at least one characteristic to be equal to a larger one of the first and second values.

19. An electric drive, comprising:

an electric machine having a rotor and a stator, the stator including a plurality of phase windings each associated with a separate phase of the stator;

a converter circuit in electrical communication with the stator; and a controller in electrical communication with the converter circuit, the controller including:

a measurement module configured to measure a phase current passing through each of the phase windings of the stator;

a pulse injection module configured to:

receive a signal from the measurement module indicative of a phase current in a phase winding of the stator;

receive rotor position feedback data from a feedback loop;

receive a first signal from a torque control module indicating a torque applied to or output by the rotor;

receive a second signal from one of a speed control module or a feedback loop indicating a rotational speed of the rotor;

determine at least one characteristic of a pulse signal for use in estimating a position of the rotor, the at least one characteristic being based on at least one of the first or second signal;

generate the pulse signal including a plurality of high frequency pulses having a pulse period lower than a period of the phase current and based at least in part on the measured phase current received from the measurement module and the rotor position feedback data provided by the feedback loop; and inject the pulse signal into the phase winding of the stator via the converter circuit;

an integrator module configured to receive the pulse signal generated by the pulse injection module and integrate the pulse signal to calculate a corresponding total flux value induced in the phase winding of the stator in which the pulse signal is injected;

an adder configured to receive the total flux value from the integrator module and a mutual flux value resulting from a mutual coupling of a set of phases of the stator of the electric machine and subtract the mutual flux value from the total flux value to determine a decoupled flux value; and a decoupled flux module configured to receive the decoupled flux value and estimate a current position of the rotor based on the decoupled flux.

20. The electric drive of claim 19, wherein the electric machine includes a switch reluctance machine.

* * * * *